(12) United States Patent
Kroschel et al.

(10) Patent No.: US 12,186,834 B2
(45) Date of Patent: Jan. 7, 2025

(54) METHOD AND DEVICE FOR OPERATING A LASER MATERIAL PROCESSING MACHINE

(71) Applicant: Robert Bosch GmbH, Stuttgart (DE)

(72) Inventors: Alexander Kroschel, Renningen (DE); Alexander Ilin, Ludwigsburg (DE); Andreas Michalowski, Renningen (DE); Heiko Ridderbusch, Schwieberdingen (DE); Julia Vinogradska, Stuttgart (DE); Petru Tighineanu, Ludswigsburg (DE); Anna Eivazi, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 703 days.

(21) Appl. No.: 17/385,475

(22) Filed: Jul. 26, 2021

(65) Prior Publication Data
US 2022/0032403 A1 Feb. 3, 2022

(30) Foreign Application Priority Data
Jul. 29, 2020 (DE) .................. 102020209570.1

(51) Int. Cl.
| | |
|---|---|
| B23K 26/40 | (2014.01) |
| B23K 26/382 | (2014.01) |
| G06F 17/18 | (2006.01) |
| G06N 20/00 | (2019.01) |
| B23K 26/0622 | (2014.01) |

(52) U.S. Cl.
CPC ............ B23K 26/40 (2013.01); B23K 26/382 (2015.10); G06F 17/18 (2013.01); G06N 20/00 (2019.01); B23K 26/0622 (2015.10)

(58) Field of Classification Search
CPC ............ G05B 2219/45041; G05B 2219/49353
See application file for complete search history.

(56) References Cited

U.S. PATENT DOCUMENTS

| | | | |
|---|---|---|---|
| 6,804,574 B2 * | 10/2004 | Liu | B23K 26/389 |
| | | | 700/166 |
| 2011/0192825 A1 * | 8/2011 | Calefati | B23K 31/12 |
| | | | 219/121.64 |
| 2015/0165549 A1 * | 6/2015 | Beutler | B23K 26/032 |
| | | | 219/121.83 |
| 2021/0245298 A1 * | 8/2021 | Kiefer | B23K 26/38 |

FOREIGN PATENT DOCUMENTS

| | | | | |
|---|---|---|---|---|
| CN | 204035807 U | * | 12/2014 | |
| CN | 207263443 U | * | 4/2018 | ........... B23K 26/702 |
| EP | 3651053 A1 | | 5/2020 | |
| WO | 2018153866 A1 | | 8/2018 | |

OTHER PUBLICATIONS

Machine translation of CN-207263443-U (Year: 2024).*
Machine translation of CN-204035807-U (Year: 2024).*

* cited by examiner

*Primary Examiner* — Geoffrey S Evans
(74) *Attorney, Agent, or Firm* — NORTON ROSE FULBRIGHT US LLP; Gerard A. Messina

(57) ABSTRACT

A computer-implemented method for operating a laser material processing machine. Process parameters are varied with the aid of Bayesian optimization until a result of the laser material processing is sufficiently good. The Bayesian optimization taking place with the aid of a data-based process model, and it being taken into consideration during the variation of the process parameters how probable it is that a variable which characterizes a quality of the result is within predefinable boundaries.

13 Claims, 6 Drawing Sheets

METHOD AND DEVICE FOR OPERATING A LASER MATERIAL PROCESSING MACHINE

CROSS REFERENCE

The present application claims the benefit under 35 U.S.C. § 119 of German Patent Application No. DE 102020209570.1 filed on Jul. 29, 2020, which is expressly incorporated herein by reference in its entirety.

FIELD

The present invention relates to a method for operating a laser material processing machine, to a test bench, to a computer program, and to a machine-readable memory medium.

BACKGROUND INFORMATION

A method for operating a laser material processing machine with the aid of Gaussian process models and Bayesian optimization is described in German Patent Application No. DE 102020205967.5.

Drilling with the aid of laser radiation is a manufacturing method for creating bores in a wide variety of materials. In the process, a workpiece is acted upon with the, for example, pulsed and focused laser beam. Due to the very high intensity, the absorbed laser energy results in a pulse-like very rapid heating of the workpiece material, which on short time scales and spatially very localized results in melt formation, and also partially in evaporation.

As a result of the vapor pressure which, by virtue of the process, is generated explosively, and also large pressure gradients associated therewith, or also due to externally supplied gas flows, the molten material is expelled from the bore. At particularly high intensities, which are implemented, e.g., through the use of laser radiation having ultrashort laser pulses, the evaporation portion is greater, and more precise bores may be achieved.

At longer pulse durations and lower intensities, the borehole formation is considerably dominated by melt expulsion, which results in a reduced precision at a considerably higher productivity. In many instances, numerous laser pulses are necessary per bore to create the desired borehole. To improve the borehole precision, the laser beam may usually be guided on a circular or spiral path at the drilling position by suitable devices.

In the case of the laser drilling manufacturing method, the process development is typically marked by experimentation since the numerous highly dynamic physical effects interacting with one another presently cannot be modeled with sufficient accuracy. This also includes that the workpiece characteristic data for the relevant pressures and temperatures are often not known. At the most, highly simplified models are available, with the aid of which a certain prediction of the achieved borehole shape is possible, with given process parameters and in certain parameter ranges. Reliable predictions regarding quality properties, such as for example solidified melt deposits within the bore, or also in the form of a burr at the borehole entrance, damage to the borehole edge, or also the circularity of the boreholes, are presently not possible using these models.

Laser welding is an established manufacturing method for creating joints of workpieces made up of different materials. In the process, the workpieces to be joined are acted upon by a focused laser beam. Due to the very high intensity, the absorbed laser energy results in very rapid local heating of the workpiece materials, which, on short time scales and spatially very localized, results in a shared weld pool formation. After the weld pool has solidified, a joint forms between workpieces in the form of a weld seam.

To meet requirements with regard to the joint strength (as well as durability), it may be desirable that the geometry of the weld seam does not fall below a minimally permissible weld seam depth as well as a minimally permissible weld seam width. To achieve the desired weld seam shapes, the process parameters may be selected in such a way that rapid and local heating of the materials due to the laser radiation results in evaporation in the weld pool. As a result of the vapor pressure which, by virtue of the process, is generated explosively, and also large pressure gradients associated therewith, or also due to externally supplied gas flows, the molten material is expelled from the weld pool. The resultant droplets of molten metal (so-called weld spatter) may result in a reduction of the component quality and/or necessitate production interruptions for cleaning the laser welding machine, which causes a considerable increase in the manufacturing costs.

As with laser drilling, the process development (process optimization with the goal of minimizing the weld spatter) during laser welding is also marked by a high level of experimentation since the numerous highly dynamic physical effects interacting with one another cannot be modeled with sufficient accuracy.

In the process, one challenge during the modeling is that the workpiece characteristic data for the relevant pressures and temperatures are often not known. The manufacturing tolerances of the individual workpieces as well as the variations in the materials may also very heavily influence the formation of weld spatter. Highly simplified models are available, with the aid of which a certain prediction of the achieved weld seam shape is possible, with given process parameters and in certain parameter ranges. A reliable prediction regarding quality properties, such as for example solidified weld spatter, however, is not possible using these models.

Since there is a large number of settable process parameters (which often are time- and location-dependent), such as laser power, focus diameter, focus position, welding speed, laser beam inclination, circular path frequency, process protective gas, the optimization of the process parameters is a protracted process, which requires a very large number of experiments. Since, on the one hand, a lot of workpieces or components are required for these experiments and, on the other hand, also the evaluation (creation of the cross sections for measuring the weld seam geometry) is complex, the number of required experiments must be reduced to a minimum.

As a result, e.g., several process parameters are set to empirical values, and only relatively few parameters are varied at all. In the process, the actually achievable optimum is generally not found.

SUMMARY

It was found that, during laser material processing, the achievable precision and productivity depends very heavily on the set process parameters, the workpiece material used, and partially also its geometry.

The quality criteria of a drilling process are numerous. Important are, for example, the size of the borehole (e.g., a depth-dependent diameter progression), a circularity of the bores, a shape of the borehole wall, potential melt deposits, droplet expulsion during the drilling process, and a rounding of the borehole edges. The productivity is typically defined by the number of creatable bores per unit of time. In addition, in practice, of course, also the costs of the necessary production equipment are crucial, the costs normally also increasing with increasing flexibility of the variable parameters.

Since there is a large number of settable process parameters (e.g., pulse duration, focus position (time-dependent), focus size, pulse repetition frequency, circular path diameter (time-dependent), circular path frequency, attack angle (time-dependent), drilling duration, pulse energy (time-dependent), wavelength, process gas type and pressure), which often may also be additionally varied as a function of the time, the optimization of the process parameters is a protracted process, which requires a very large number of experiments. Since, on the one hand, a lot of workpieces or components are required for these experiments and, on the other hand, also the evaluation (in particular, of the inner borehole shape) is complex, the number of required experiments must be reduced to a minimum.

For this reason, several process parameters are set to empirical values, and only relatively few parameters are varied at all. For this reason, the actually achievable optimum may generally be difficult to find. Experimental series predefined by experts and/or also methods of statistical experimental planning are possible as a planning method for the experiments.

Since there is a large number of settable process parameters (which often are time- and location-dependent), such as laser power, focus diameter, focus position, welding speed, laser beam inclination, circular path frequency, process protective gas, the optimization of the process parameters is also a protracted process during laser welding, which requires a very large number of experiments. Since, on the one hand, a lot of workpieces or components are required for these experiments and, on the other hand, also the evaluation (creation of the cross sections for measuring the weld seam geometry) is complex, it is desirable to reduce the number of required experiments to a minimum.

An example embodiment of the present invention has the advantage over the related art that process parameters of laser material processing machines which ensure a high quality of the laser material processing may be found with only few experiments.

Further aspects of the present invention are disclosed herein. Advantageous refinements of the present invention are disclosed herein.

The present invention relates to the manner for being able to carry out an efficient and purposeful optimization of the process parameters. In accordance with an example embodiment of the present invention, for this purpose, the method of Bayesian optimization is used. With the aid of this method, optima in functions for which no analytical description is known may be found. An optimum is characterized by target values $q_{i,Target}$ for one or multiple quality property/properties $q_i$, which is/are specified by a user. Multiple quality properties may be computed in a so-called cost function K to obtain a single function to be optimized. This cost function also has to be predefined by the user. One example is the sum of scaled deviations for the respective target value:

$$K = \Sigma_{i=1}^{N} s_i |q_{i,Target}| \tag{1}$$

In the process, parameters $s_i$ are predefinable scaling parameters. To find the optimum of the cost function, parameter sets for the next experiment may be proposed through the use of Bayesian optimization. After the experiment has been carried out, the resulting values of the quality criteria, and thus the instantaneous cost function value, may be determined and provided, together with the set process parameters, to the optimization method as a data point.

The Bayesian optimization method is suitable for finding the input parameter set which leads to the optimal output value for a function which maps a multidimensional input parameter space to scalar output values. If this multidimensional input parameter space, seen mathematically, is a compact space, i.e., in particular, limited in each direction by an upper and a lower limit, it is even guaranteed that the optimal output value will be found. Depending on the optimization goal, the optimum is defined in the process as the greatest possible, or alternatively also minimally achievable, value which the function values may assume. Within the meaning of the process optimization, for example, the input parameter set is given by a certain set of process parameters, and the associated output value may be ascertained by the above-described cost function.

Since experiments must be carried out and evaluated for the determination of the function values of the cost function, generally only a value table including data which also still include experimental "noise" is available from the function. Since the experiments are very complex, this noise normally cannot be suppressed by numerous repetitions with the same input parameter set, with subsequent averaging of the results. For this reason, it is advantageous to carry out the optimization using a method which, despite fewer experiment evaluations, also enables a global optimization with good results, and in the process does not require a calculation of gradients of the cost function. It was found that the Bayesian optimization satisfies these properties.

The Bayesian optimization is made up of the mathematical method of the Gaussian processes, with the aid of which, based on a given value table, a continuous function is created, which for each input parameter set yields a prediction of the most likely function value, including its statistical variance, and an algorithmically formulated instruction as to for which input parameter set a further function evaluation (for us, thus, an experiment) is to be carried out, which is based on the predictions of the Gaussian process.

Specifically, the prediction for the result of the function evaluation for an input parameter set $x_{N+1}$ is given by the most likely value ("mean value") of the Gaussian process $$m(x_{N+1}) = k^T C_N^{-1} t \tag{2}$$

having the variance $$\sigma^2(x_{N+1}) = c - k^T C_N^{-1} k \tag{3}$$

Here, $C_N$ denotes the covariance matrix, which is given by $$c(x_n, x_m) = k(x_n, x_m) + \beta \delta_{nm} \tag{4}$$

with $x_n$ or $x_m$ being parameters for which a function evaluation has already taken place. Variable $\beta$ represents the variance of the normal distribution, which denotes the reproducibility of experiments with the same input parameter, $\delta_{nm}$ being the Kronecker symbol. Scalar c is conventionally given by $c = k(x_{N+1}, x_{N+1}) + \beta^{-1}$.

Vector t includes the respective results for the individual parameter sets $x_i$ at which a function evaluation has taken place. Vector k includes the values of the kernel function, which encodes the information as to what extent the result of the function evaluation, at a parameter set $x_n$, still has influence on the result of the function evaluation at a parameter set $x_m$. In the process, large values denote a high influence, and when the value is zero, there is no more influence.

For the prediction of the mean value and the variance in the above formula, k is calculated for this purpose from all input parameter sets $x_i$ (i=1 ... N) and parameter set $x_{N+1}$ to be predicted. There are different approaches for the kernel function to be used in the specific case, the following exponential kernel representing a very simple approach:

$$k(x_n, x_m) = \Theta_0 \exp(-\Theta_1 \|x_n - x_m\|) \quad (5)$$

with the selectable hyperparameters $\Theta_0$ and $\Theta_1$. In this kernel, $\Theta_1$ is crucial for the influence of the "distance" between the function values at input parameters $x_n$ and $x_m$ since the function for large values of $\theta_1$ goes toward zero. Other kernel functions are possible.

The selection of the next parameter set at which an experiment is to be carried out is based on the predictions of mean values and variance which are calculated using the above formulas. Different strategies are possible here, for example that of "expected improvement."

In the process, the input parameter set at which the expected value for finding a function value is greater (or less, depending on the optimization goal) than the greatest known function value $f_n^*$ thus far in the existing N iteration is selected for the next experiment, i.e., $$x_{N+1} = \mathrm{argmax}\, E_N[[f(x) - f_N^*]^+] \quad (7)$$

Such a function to be optimized is also referred to as acquisition function. Other acquisition functions are possible, for example a knowledge gradient or an entropy search.

The "+" operator here means that only positive values are used, and negative values are set to zero. During the Bayesian optimization, now
- a new experiment point (i.e., input parameter set) is iteratively determined,
- an experiment is carried out, and
- the Gaussian process is updated with the new function value until the optimization is aborted.

The optimization of the Gaussian process using the new experiment point and the new function value takes place by training the GPs, i.e., for example in such a way that the new pair made up of the experiment point and the function value is added to the already included experiment data made up of pairs of experiment points and function values, and the hyperparameters are adapted in such a way that a likelihood of the experiment data is maximized.

This procedure is illustrated in connection with FIG. 4.

As a result of the iterative procedure of the above-described steps (carrying out an experiment, evaluating the quality criteria, and determining the cost function value, updating the Gaussian process, and proposing the next parameter set), a process model (mapped by the Gaussian process) may be successively created. The best parameter set of all evaluated function evaluations or experiments is then used as the best optimization result.

Advantages while carrying out the optimization are gained by incorporating existing process knowledge. Using the procedure described hereafter, knowledge in the form of one or multiple process model(s) $P_{1...n}$ may be incorporated in the optimization by complementing real experiments with simulation experiments. It is immaterial in the process with what uncertainty the models map the process, and how many of the quality criteria they describe.

Each real experiment could be replaced with a simulation experiment with the aid of a process model which would perfectly map the real experiment. If the evaluation duration were lower than the real execution, time would also be saved, in addition to the complexity. In general, however, the prediction accuracy of the process models is limited. Instead, they are only valid in a portion of the parameter space, describe only a subset of the process results, or do not take all physical effects into consideration, and thus only generate results within an uncertainty band. In general, process models thus cannot completely, but only partially, replace physical experiments.

To now integrate these simulation results, it is possible that Gaussian process model GP encompasses a first Gaussian process $GP_0$, which, as is illustrated in FIG. 6, is trained with the aid of the simulatively ascertained results, and encompasses a second Gaussian process $GP_1$, which is trained with the aid of the experimental results. Initially, first Gaussian process $GP_0$ is trained with the aid of the simulation results and the associated process parameters.

Then, second Gaussian process $GP_1$ is trained with the aid of the actual, experimental results $y_{exp}$ and the associated process parameters $x_{exp}$, and in particular, by ascertaining actual results $y_{exp}$ with the aid of the difference of the actual results $y_{exp}$ and the prediction of first Gaussian process $GP_0(x_{exp})$ at the associated process parameters $x_{exp}$, i.e.

$$y_{exp} \rightarrow y_{exp} - GP_0(x_{exp}) = y_{exp}^*.$$

In a first method for operating a laser material processing machine 1, 2, process parameters x which characterize an operating mode of laser material processing machine 1, 2 being varied with the aid of Bayesian optimization until a result y of the laser material processing is sufficiently good, the Bayesian optimization taking place with the aid of a data-based process model GP, in particular a Gaussian process model, and it being taken into consideration during the variation of process parameters x how probable it is that a variable $\mathcal{D}$ which characterizes a quality of result y is within predefinable boundaries $\mathcal{D}_0 - \delta, \mathcal{D}_0 + \delta$.

In this way, it is possible in a particularly simple manner to select the variations of the process parameters as deliberately as possible and to allow the process parameters to be set automatically in a particularly short time.

This may take place in that a value of a cost function is ascertained as a function of result y, i.e., as a function of the variables which characterize result y, and it is then ascertained whether this value of the cost function falls below a predefinable threshold value. Variables which characterize the result of the laser material processing may characterize the product generated with the aid of the laser material processing, and/or the process of generating.

In the process, the value of the cost function may be ascertained as a function of how much the estimated or actual variables deviate from setpoint variables which characterize a setpoint result of the laser material processing.

As a result of the Bayesian optimization, it is possible to quickly ascertain an optimum, without having to ascertain gradients, which would not only necessitate numerous actual steps of the laser material processing, but due to the inevitable experimental noise could also only be unreliably ascertained via difference quotients. To make this noise sufficiently small, a very large number of experiments would be necessary, which may be saved through the use of Bayesian optimization. In addition, a global optimization is achieved with the aid of Bayesian optimization, while a gradient descent method only finds a local optimum.

Furthermore, it has been shown that, as a result of an extrapolation of the actual result being modeled by a probability, a particularly simple integration may take place in that, in an acquisition function which is optimized for the variation of the process parameters, a probability is taken into consideration which characterizes how probable it is that the actual result is within predefinable boundaries.

It is particularly efficient when probability p(x) is ascertained based on a data-based quality model $GP_D$, in particular, a Gaussian process model, since this may then be trainable within the cycle of the Bayesian optimization, and may thus be adapted particularly flexibly to the invariably specific circumstances of the laser material processing. In this way, the method becomes particularly robust.

This is particularly efficient when the data-based model $\mathcal{D}$ is designed to output parameters $m, \sigma^2$ which characterize a statistical prediction of actual result $y_{exp}$ to be expected.

The reason is that it is possible to directly ascertain the aforementioned probability from the statistical prediction, for example with the aid of numerical integration.

In one further aspect, the present invention may be generalized to the adherence of further boundary conditions when it is taken into consideration during the variation of process parameters x how probable it is that further variables $\mathcal{F}, \mathcal{F}$, which each characterize further qualities of result y, are within respective predefinable boundaries $\mathcal{D}_0-\delta, \mathcal{D}_0+\delta, \mathcal{F}_0-\in, \mathcal{F}_0+\in, \epsilon_0-\phi, \mathcal{F}_0+\phi$, the respective probabilities being ascertained with the aid of a respective further data-based quality model $GP\mathcal{F}, GP_\mathcal{F}$.

Advantageously, it is provided in the process during the cycle of the Bayesian optimization that one, several or all of the data-based models are trained as a function of the values which actually result during the activation of the laser material processing machine, i.e., that data-based process model GP and/or data-based quality model $GP_D$ and/or one or multiple of the respective further data-based quality models $GP\mathcal{F}, GP_\mathcal{F}$ are trained as a function of the ascertained result y which results during the activation of the laser material processing machine, and/or of the ascertained variable $\mathcal{D}$ which results during the activation of the laser material processing machine, and/or the ascertained further variables $\mathcal{F}, \mathcal{F}$ which result during the activation of the laser material processing machine. This causes a rapid convergence of the Bayesian optimization method, and thus causes optimal process parameters to be found quickly.

Advantageously, it may be provided that data-based model GP and/or data-based quality model $GP_D$ and/or one or multiple of the respective further data-based quality model(s) $GP\mathcal{F}, GP_\mathcal{F}$ is/are also trained as a function of a simulatively ascertained estimated result $y_{sim}$.

For example, it may be provided that the estimated result is ascertained with the aid of a physical model of the laser material processing. By integrating simulative results, it is possible to considerably reduce the number of necessary laser material processing steps.

This reduction of the necessary experiments is particularly effective when, in a first phase A, data-based model GP and/or data-based quality model $GP_D$ and/or one or multiple of the respective further data-based quality model(s) $GP\mathcal{F}$, $GP_\mathcal{F}$ is/are trained as a function of estimated results $y_{sim}$ (i.e., not as a function of results of an actual activation of the laser material processing machine), in a second phase B, data-based model $\mathcal{D}$ and/or data-based quality model $GP_D$ and/or one or multiple of the respective further data-based quality model(s) $GP\mathcal{F}, GP_\mathcal{F}$ being trained as function of the ascertained result y which results during the activation of laser material processing machine 1, 2 and/or ascertained variable $\mathcal{D}$ which results during the activation of laser material processing machine 1, 2 and/or the ascertained further variables $\mathcal{F}, \mathcal{F}$ which result during the activation of laser material processing machine 1, 2.

In this way, it is possible in a particularly simple manner to keep the number of necessary experiments low, and at the same time compensate for a potential systematic error of the simulations to be carried out quickly relative to the experiments.

In a method in accordance with an example embodiment of the present invention, data-based model GP, $GP_D$, $GP_E$, $GP_F$ to be trained is given as the sum of a first regression model $GP_0$ and a second regression model $GP_1$, first regression model $GP_0$ being trained during first phase A, and second regression model $GP_1$ being trained during second phase B.

In particular, potential shortcomings of the simulation model may be compensated for in a particularly simple manner.

Advantageously, this may take place by training experimentally trained regression model $GP_1$ with the aid of a difference between actual results $y_{exp}$ and a value of the simulatively trained regression model $GP_0$ at process parameters $x_{exp}$ associated with actual result $y_{exp}$.

In this way, it is possible to train experimentally trained regression model $GP_1$ in a particularly simple manner for the error of simulatively trained regression model $GP_0$. This is particularly advantageous since, in this way, the complex experiments may be limited particularly well to those areas in which relevant deviations of the simulations model are present.

It is particularly advantageous when experimentally trained second regression model $GP_1$ is a Gaussian process model since it has the mathematical property that the mean value (m) predicted by it, in an area outside the most extremal experimentally evaluated process parameters $x_{exp}$, trends toward a predefinable a priory function of the mean value of the Gaussian model ("mean prior"). In this way, the behavior of the second regression model may be controlled in a particularly simple manner.

The described methods in accordance with example embodiments of the present invention thus allow process parameters x to be set, it being possible, subsequent to process parameters x being set, to operate the laser material processing machine with process parameters x thus set.

Specific embodiments of the present invention are described hereafter in greater detail with reference to the figures.

DETAILED DESCRIPTION OF EXAMPLE EMBODIMENTS

Figure 1:
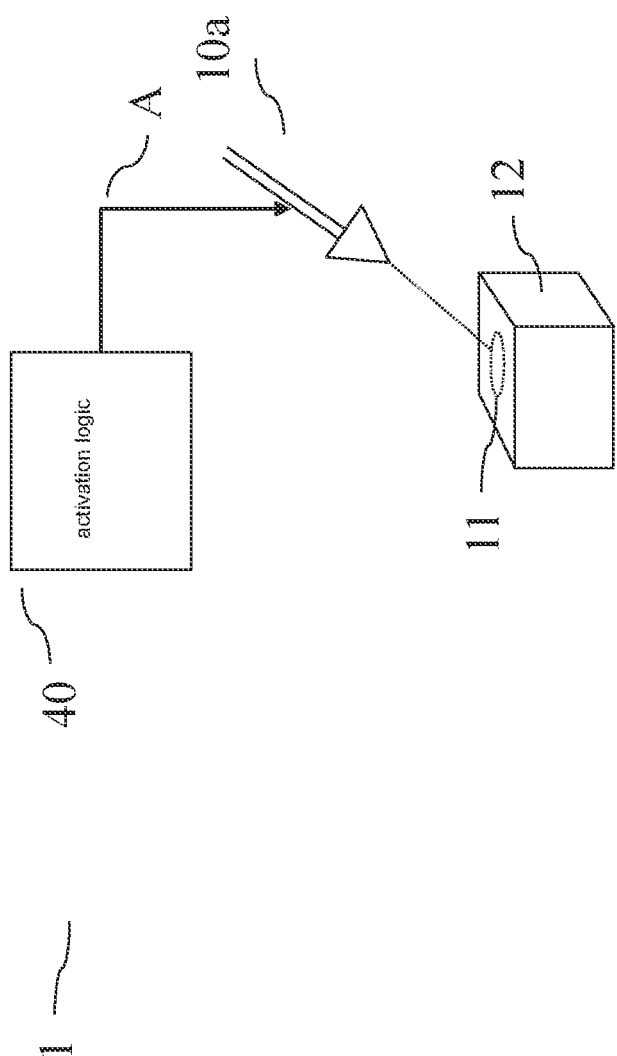
FIG. 1 schematically shows a configuration of a laser drilling machine in accordance with an example embodiment of the present invention.

FIG. 1 schematically shows a configuration of a laser drilling machine 1. An activation signal A is provided by an activation logic 40 to activate a laser 10a. The laser beam strikes a material piece 12 where it generates a borehole 11.

Figure 2:
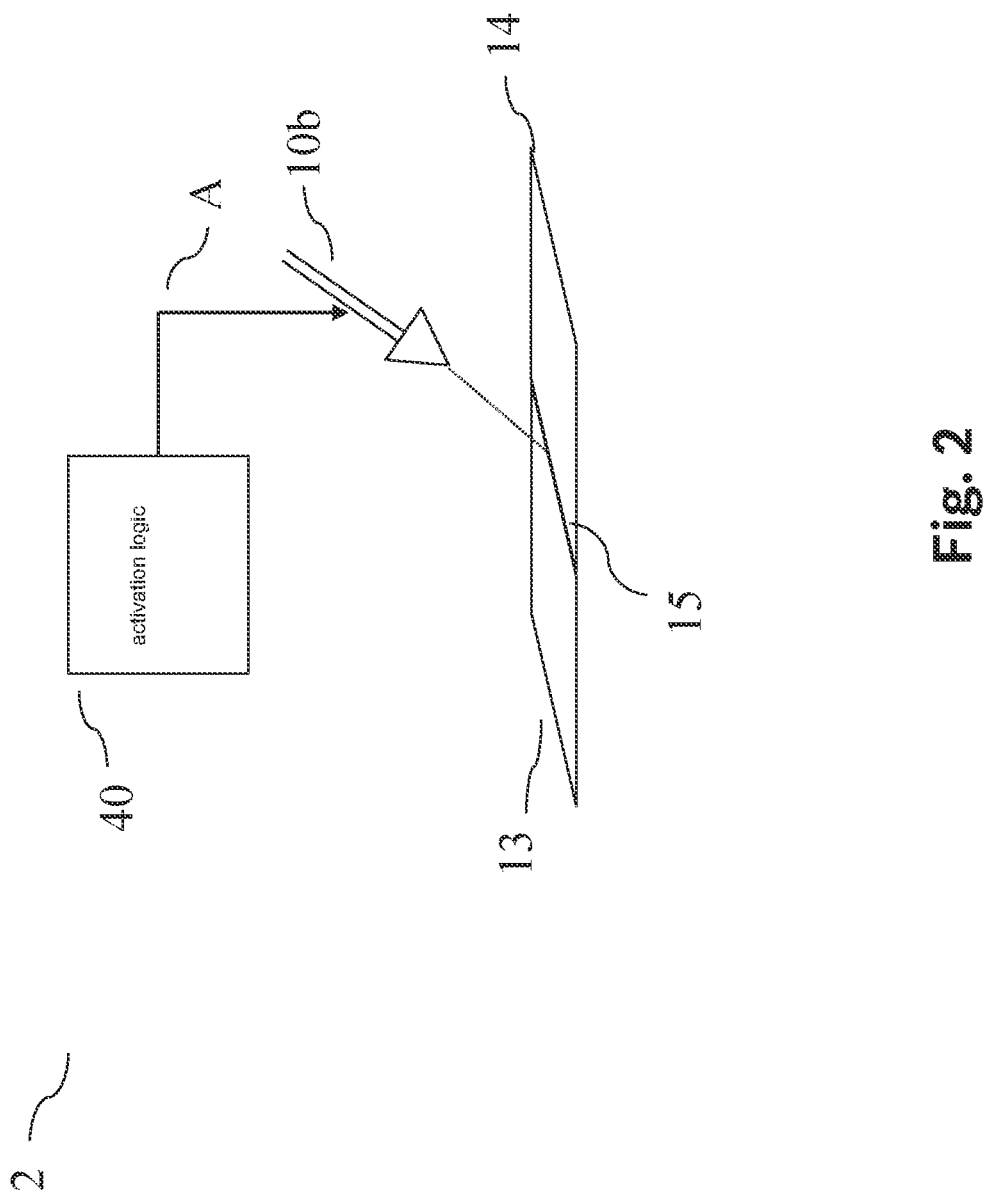
FIG. 2 schematically shows a configuration of a laser welding machine in accordance with an example embodiment of the present invention.

FIG. 2 schematically shows a configuration of a laser welding machine 2. An activation signal A is also provided by an activation logic 40 here to activate a laser 10b. The laser beam strikes two material pieces 13, 14 and generates a weld seam 15 there.

A laser cutting machine (not shown) is also analogously possible.

Figure 3:
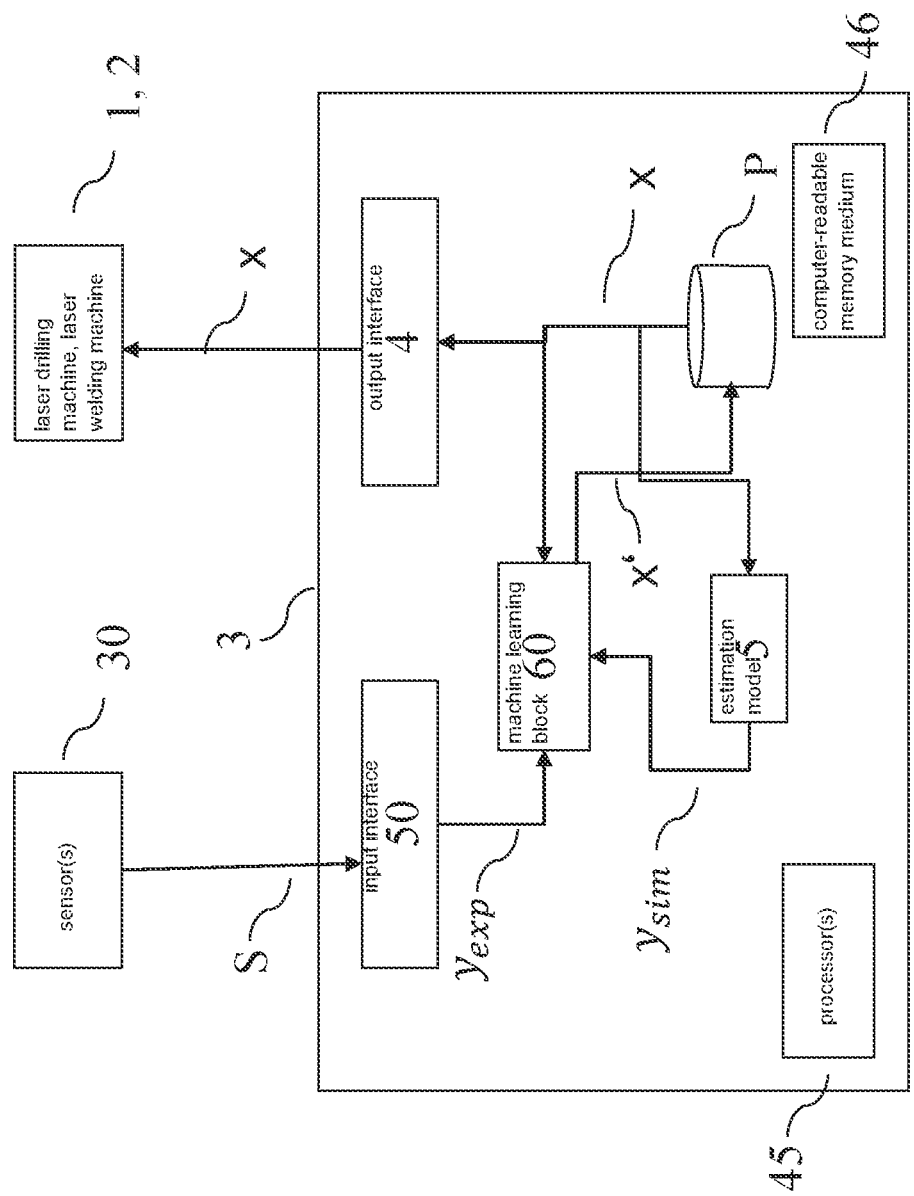
FIG. 3 schematically shows a configuration of a test bench in accordance with an example embodiment of the present invention.

FIG. 3 schematically shows a configuration of a test bench 3 for ascertaining optimal process parameters x. Instantaneous process parameters x are provided by a parameter memory P via an output interface 4 of the laser material processing machine, such as e.g. laser drilling machine 1 or laser welding machine 2. The machine carries out the laser material processing as a function of these provided process parameters φ. Sensors 30 ascertain sensor variables S, which characterize the result of the laser material processing. These sensor variables S are provided via an input interface 50 to a machine learning block 60 as quality properties $y_{exp}$.

Figure 4:
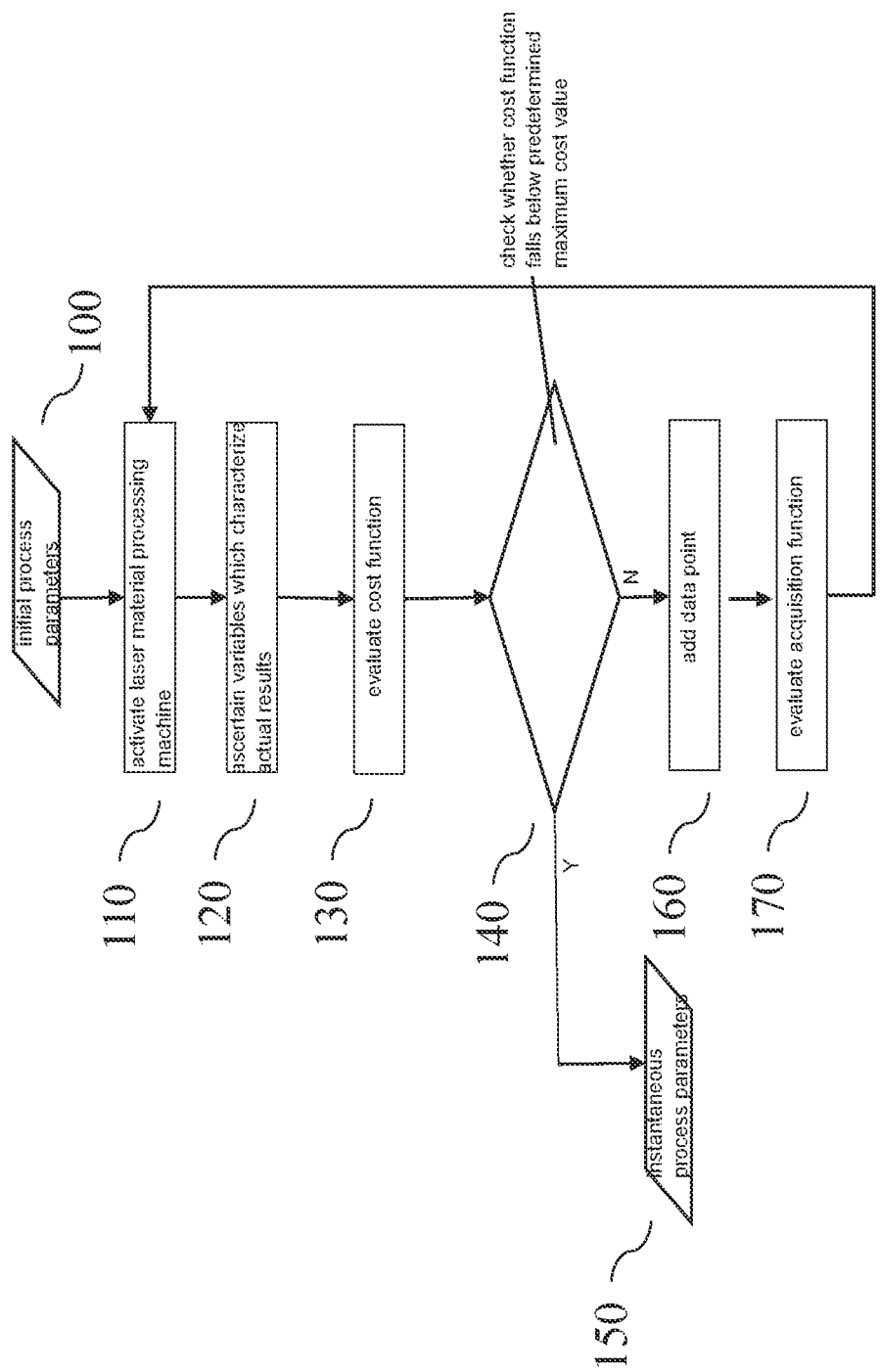
FIG. 4 shows one specific embodiment for operating the test bench in a flowchart in accordance with the present invention.
Figure 5:
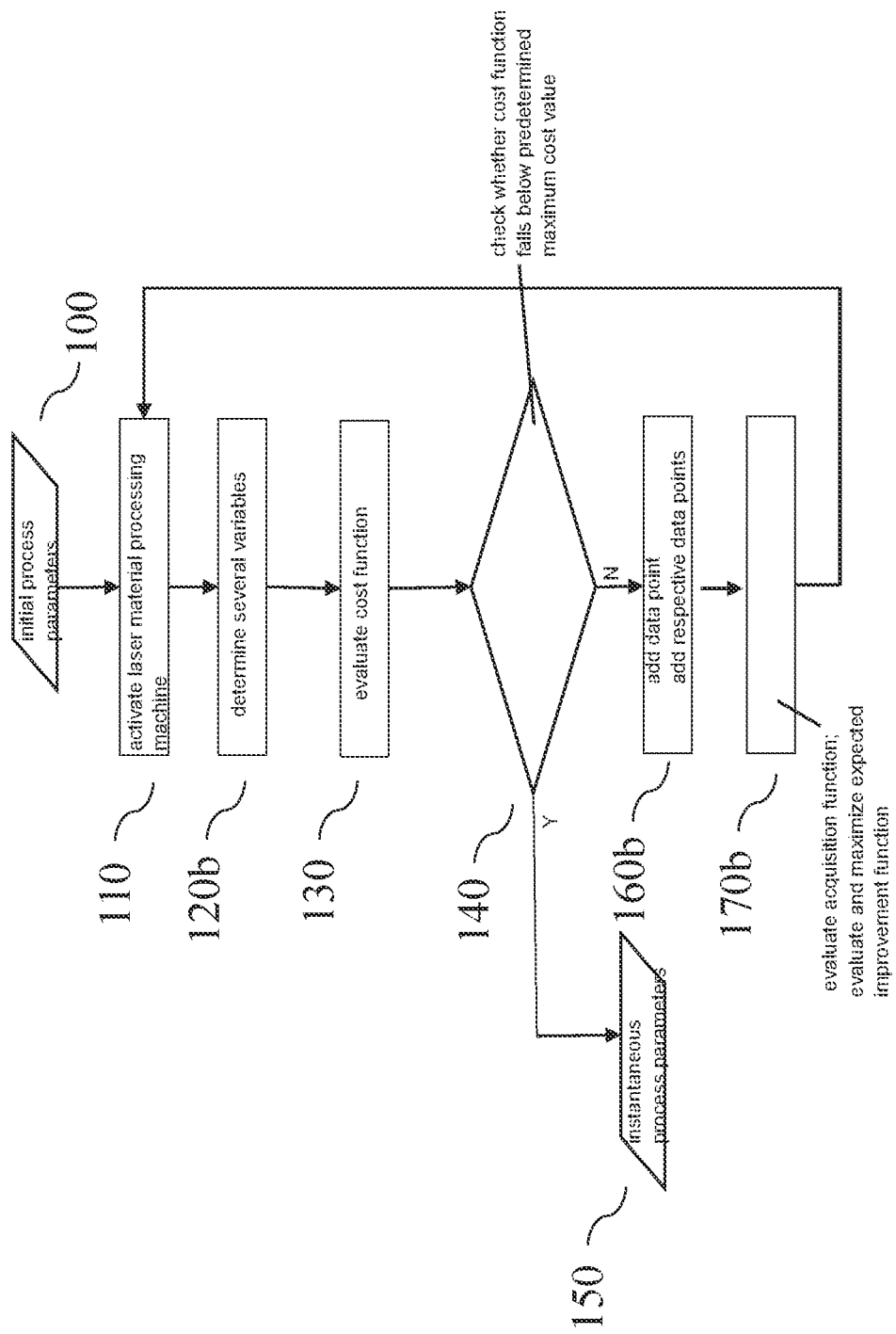
FIG. 5 shows one specific embodiment for operating the test bench in a flowchart in accordance with the present invention.

In the exemplary embodiment of the present invention, machine learning block 60 encompasses a Gaussian process model, which, as is illustrated in FIG. 4 or FIG. 5, is trained as a function of the provided quality properties $y_{exp}$. As a function of the Gaussian process model, varied process parameters x' may be provided, which are stored in parameter memory P.

As an alternative or in addition to the provision via output interface 4, process parameters x may also be provided to an estimation model 5, which provides estimated quality properties $y_{sim}$ to machine learning block 60 in place of the actual quality properties $y_{exp}$.

In the exemplary embodiment of the present invention, the test bench includes a processor 45, which is configured to play back a computer program which is stored on a computer-readable memory medium 46. This computer program includes instructions which prompt processor 45 to execute the method illustrated in FIG. 4 or 5 when the computer program is being played back. This computer program may be implemented in software, or in hardware, or in a mixed form made up of hardware and software.

FIG. 4, in a flowchart, shows an exemplary method for operating test bench 3 in accordance with an example embodiment of the present invention. The method begins 100 in that initial process parameters $x_{init}$ are provided as process parameters x, and experimental data recorded thus far are initialized as an empty set. Optionally, process parameters x are predefined using a design-of-experiment method and, as is described in greater detail hereafter, laser material processing machine 1, 2 is activated with the aid of these process parameters x, variables $y_{exp}$ are ascertained, and Gaussian process model GP is trained using the experimental data thus ascertained.

In the case of laser drilling, these process parameters x in one exemplary embodiment encompass a pulse duration, a focus position resolved as a function of time via a characteristic map and/or a focus size and/or a pulse repetition frequency and/or a circular path diameter resolved as a function of time via a characteristic map as a function of time and/or a circular path frequency and/or an attack angle resolved as a function of time via a characteristic map and/or a drilling duration and/or a pulse energy resolved as a function of time via a characteristic map and/or a wavelength and/or parameters which characterize a process protective gas, such as, e.g., a process gas type or a process gas pressure. In the process, the described circular path is a conventional feature in many drilling methods, for example during spiral drilling or during trepanning drilling.

In the case of laser welding, these process parameters x encompass a laser power resolved as a function of time and/or location via characteristic maps and/or a focus diameter and/or a focus position and/or a welding speed and/or a laser beam inclination and/or a circular path frequency during laser wobbling and/or parameters characterizing a process protective gas.

Using the instantaneous process parameters x, laser material processing machine 1, 2 is activated 110, and variables $y_{exp}$ are ascertained 120, which characterize the actual result of the laser material processing.

In the case of laser drilling, these variables $y_{exp}$, in one exemplary embodiment, encompass variables which characterize the size of borehole 12 and/or the circularity of borehole 12 and/or the shape of a wall of borehole 12 and/or the presence of melt deposits and/or an amount of droplet expulsion during the drilling process and/or a rounding of the edges of borehole 12 and/or the productivity.

In the case of laser welding, these variables $y_{exp}$, in one further exemplary embodiment, encompass variables which, along weld seam 15, characterize a minimal weld seam depth and/or a minimal weld seam width and/or the productivity and/or an extent of weld spatter and/or a number of pores and/or a welding distortion and/or residual welding stresses and/or welding cracks.

A cost function K is evaluated 130 as a function of these variables, as it may be given, for example, by equation 1, variables $y_{exp}$ being provided as quality properties $q_i$ and corresponding target values of these variables $q_{i,Target}$.

A cost function K which penalizes deviations of the quality properties from the target values is also possible, in particular, if they exceed a predefinable tolerance distance, and which rewards a high productivity. The "penalizing" may, e.g., be implemented by a high value of cost function K, the "rewarding" accordingly by a low value.

Then, it is ascertained whether cost function K indicates that instantaneous process parameters x are sufficiently good, in the event that a penalization denotes a high value, and a reward denotes a low value, by checking whether cost function K falls below 140 a predefinable maximum cost value. If this is the case ("Yes"), the method ends 150 with the instantaneous process parameters x.

If this is not the case ("No"), data point $x, y_{exp}$ thus ascertained, made up of process parameters x and associated variables $y_{exp}$ characterizing the result, is added 160 to the ascertained experiment data, and hyperparameters $\Theta_0, \Theta_1$ of Gaussian process model GP are adapted in such a way that the probability that the experiment data result from Gaussian process model GP is maximized.

Then 170, an acquisition function is evaluated, as it is illustrated by way of example in formula 7, and in this way new process parameters x' are ascertained. The method then branches back to step 110.

FIG. 5, in a flowchart, shows one further exemplary method for operating test bench 3. Steps 100, 110, 130, 140, 150 are the same as illustrated in FIG. 4; a separate description is thus dispensed with.

In step 120b, which replaces step 120 of the method illustrated in FIG. 4, several of variables $y_{exp}$ determined there are in each case provided separately as limited variables $\mathcal{D}$, $\mathcal{F}$, $\mathcal{F}$, ..., which each are to be in a limited interval: $\mathcal{D} \in [\mathcal{D}_0-\delta, \mathcal{D}_0+\delta]$, $\mathcal{F} \in [\mathcal{F}_0-\epsilon, \mathcal{F}_0+\epsilon]$, $\mathcal{F} \in [\mathcal{F}_0-\phi, \mathcal{F}_0+\phi]$, ....

In step 160b, which replaces step 160 of the method illustrated in FIG. 4, in addition to the step described in step 160, additionally for each of limited variables $\mathcal{D}$, $\mathcal{F}$, $\mathcal{F}$ a respective data point $x, \mathcal{D}$, $x, \mathcal{F}$, $x, \mathcal{F}$, ... is added to the respective ascertained test data, i.e., assigned to each of limited variables $\mathcal{D}$, $\mathcal{F}$, $\mathcal{F}$, and analogously to the training of Gaussian model GP, a dedicated Gaussian process model $GP_\mathcal{D}, GP\mathcal{F}, GP_\mathcal{F}$ is trained for each of limited variables $\mathcal{D}$, $\mathcal{F}$, $\mathcal{F}$.

In step 170b, which replaces step 170 of the method illustrated in FIG. 4, in addition to the evaluation of the acquisition function described for 170. For this purpose, as described above, a so-called "expected improvement" function may be evaluated and maximized, as illustrated in formula 7. Furthermore, a predefinable probability function $p_\mathcal{D}(x)$ is provided, which characterizes a probability as to whether or not selected process parameters x of laser material processing machine 1, 2 result in a satisfactory result, i.e., whether limited variables D are actually in the associated interval, i.e., $\mathcal{D} \in [\mathcal{D}_0-\delta, \mathcal{D}_0+\delta]$. For the further limited variables $\mathcal{F}$, $\mathcal{F}$, ..., corresponding probability functions $p\mathcal{F}(x)$, $p_\mathcal{F}(x)$ are provided.

In the exemplary embodiment, probability function $p_\mathcal{D}(x)$ is ascertained from a variance $\sigma^2$ of Gaussian process model $\mathcal{D}$. For this purpose, lower boundaries $\mathcal{D}_0-\delta$ and upper boundaries $\mathcal{D}_0+\delta$ are provided for the variables ascertained by Gaussian process model $\mathcal{D}$ and, for example with the aid of numerical integration, it is ascertained how great the probability is that the variables ascertained by Gaussian process model $\mathcal{D}$ are between lower boundary $\mathcal{D}_0-\delta$ and upper boundary $\mathcal{D}_0+\delta$, i.e., $p_\mathcal{D}(x) := p(\mathcal{D}_0-\delta < \mathcal{D}(x) < \mathcal{D}_0+\delta)$. The procedure may be analogous for probability functions $p\mathcal{F}(x)$, $p_\mathcal{F}(x)$. The described acquisition function may now be additionally multiplied with the product of the ascertained probabilities $p_\mathcal{D}(x) \cdot p\mathcal{F}(x) \cdot p_\mathcal{F}(x) \ldots$, and new process parameters (x') are thus ascertained. The method then branches back to step 110.

Figure 6:
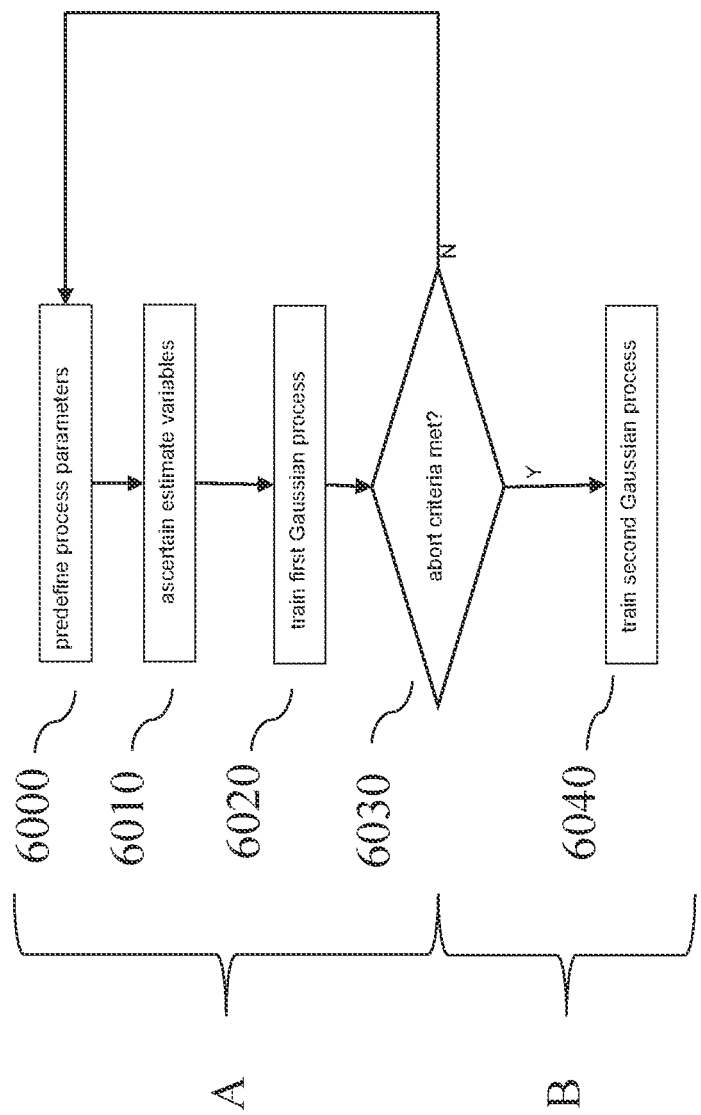
FIG. 6 shows one specific embodiment of a sub-aspect of one of the two aforementioned methods in a flowchart in accordance with the present invention.

FIG. 6 illustrates, in a flowchart, the sequence of a method as it may be used for training Gaussian process models $GP, GP\mathcal{D}, GP\mathcal{F}, GP_\mathcal{F}$. It is illustrated hereafter by way of example based on Gaussian process model GP and may be applied accordingly to any of the others.

The method is made up of the first Gaussian process $GP_0$ and the second Gaussian process $GP_1$, which together additively yield Gaussian process model GP, i.e., $$GP(x) = GP_0(x) + GP_1(x).$$

The method is made up of a first phase A and a second phase B. In each of the phases, the method illustrated in FIG. 4 or that illustrated in FIG. 5 may be used, in first phase A the simulatively ascertained estimated variables $y_{sim}$ taking the place of actual variables $y_{exp}$.

In first phase A, initially process parameters x are predefined 6000. Then, estimated variables $y_{sim}$ are ascertained simulatively 6010.

In the case of laser drilling, this may take place, for example, as follows with the aid of a physical model: For a radius r of borehole 11 along a depth coordinate z, r(z) is numerically ascertained as the solution to equation $$[1 - R(r,z,\alpha,\theta)] \cdot \cos\theta \cdot F_0(r,z) - \tilde{F}_{th} = 0 \quad (8)$$

with $$1 - R = \frac{1}{2} \cdot \left( \frac{4n\cos\theta}{(n^2+k^2) + 2n\cos\theta + \cos^2\theta} + \frac{4n\cos\theta}{(n^2+k^2)\cos^2\theta + 2n\cos\theta + 1} \right) \quad (9)$$

$$F_0(r, z) = \frac{2Q}{\pi w^2(z)} \cdot \exp\left(-\frac{2r^2}{w^2(z)}\right) \quad (10)$$

$$w(z) = \frac{d_{Fok}}{2} \sqrt{1 + \left(\frac{z}{l_{Rayleigh}}\right)^2} \quad (11)$$

$$\tan\alpha = \frac{r}{w(z)} \frac{dw(z)}{dz} \quad (12)$$

Where:
  $\bar{n} = n + ik$ is a predefinable complex refractive index of material piece 12, with refractive index n and coefficient of extinction k;
  $\tilde{F}_{th}$ is a predefinable ablation threshold fluence of material piece 12;
  Q is a predefinable pulse energy of laser 10a;
  $d_{Fok}$ is a predefinable focus diameter of laser 10a;
  $l_{Rayleigh}$ is a predefinable Rayleigh length of laser 10a;
  R is an ascertained reflectivity of material piece 12;
  $\alpha$ is an ascertained angle of the local beam propagation direction;
  $\theta$ is a predefinable relative angle between the incident laser beam and the surface normal of material piece 12;
  $F_0$ is an ascertained irradiated fluence of laser 10a; and
  w(z) is an ascertained local beam radius.

The prediction of several quality properties, such as a presence of melt deposits and/or an amount of droplet expulsion during the drilling process, is not possible using this physical model. For the ascertainment of these quality properties, an empirical model may be predefined in the process, for example.

As an alternative or in addition, it is possible that at least several of the quality properties cannot be reliably calculated for all process parameters x. It is possible that it is checked whether the instantaneous process parameters x are within a predefinable area, and that, when this is not the case, the quality properties are ascertained with the aid of one of the aforementioned approaches.

In the case of laser welding, the ascertainment of estimated variables $y_{sim}$ may, for example, take place as follows using a physical model:

$$T(x, y, z) - T_0 = \frac{1}{2\pi\lambda h} \frac{v(x-x_0)}{2a} \exp - \\ \left( q_{net} K_0\left(\frac{vr}{2a}\right) + 2\sum_{m=1} \cos\frac{m_{pi}z}{h} K_0\left(\frac{vr}{2a} \sqrt{1 + \left(\frac{2m_\pi a}{vh}\right)^2}\right) I_m \right) \quad (13)$$

with $$r = \sqrt{(x-x_0)^2 + y^2} \quad (14)$$

$$I_m = \int_0^h q_{1net}(z) \cos\frac{m_\pi z}{h} dz \quad (15)$$

and the parameters
  $T_0$—a predefinable ambient temperature;
  $x_0$—a predefinable offset of the beam of laser 10b in relation to the origin of a coordinate system movable with laser 10b;

λ—a predefinable thermal conductivity of material pieces 13, 14;
a—a predefinable temperature conductivity of material pieces 13, 14;
$q_{net}$—a predefinable power of laser 10*b*;
$q_{1net}$—a predefinable power distribution of laser 10*b* along a depth coordinate of material piece 10*b*;
v—a predefinable velocity of laser 10*b*;
h—a predefinable thickness of material pieces 13, 14; and
Bessel function $$K_0(\omega) = \frac{1}{2}\int_{-\infty}^{\infty}\frac{e^{i\omega t}}{\sqrt{t^2+1}}dt$$

as well as an ascertained temperature distribution T(x,y,z). A width or a depth of the weld seam may be ascertained (e.g., via the ascertainment of isotherms at a melting temperature of a material of material pieces 13, 14) from the temperature distribution.

Then, first Gaussian process $GP_0$, which trains 6020 with the aid of estimated results $y_{sim}$.

Thereafter, it is checked whether an abort criterion is reached 6030. For example, it may be checked whether a cost function K ascertained as a function of estimated result $y_{sim}$ falls below a predefinable threshold value. If the abort criterion is met, second phase B follows, otherwise the method branches back to 6000.

In second phase B, the method illustrated in FIG. 4 or FIG. 5 is executed 6040, in place of Gaussian process model GP second Gaussian process $GP_1$ being trained with the aid of actual results $y_{exp}$ and the associated process parameters x, and in particular, in that actual results $y_{exp}$ are ascertained by the difference of the actual results $y_{exp}$ and the prediction of first Gaussian process $GP_0(x)$ at the associated process parameters $x_{exp}$, i.e., $$y_{exp} \rightarrow y_{exp} - GP_0 = y_{exp}^*. \tag{16}$$

Using the actual results $y_{exp}^*$ thus transformed and the associated process parameters $x_{exp}$, second Gaussian process $GP_1$ is then trained.

In place of first Gaussian process $GP_0$, it is also possible to use another suitable regression model. For example, it is possible to use a suitable (possibly defined piecewise) polynomial or a spline instead.

What is claimed is:

1. A computer-implemented method for operating a laser material processing machine, the method comprising:
   beginning with an initial set of respective values as respective current values of a plurality of process parameters, performing an iterative process that gradually modifies the respective current values to a final set of the respective values, the iterative process including the following in each iteration of the iterative process, except a final one of the iterations:
   (a) actuating, by a processor system that includes at least one processor, the laser material processing machine to perform a machining of a workpiece while set with the respective current values of the plurality of process parameters;
   (b) obtaining sensor data by a sensor system sensing results of the machining performed in the respective iteration;
   (c) determining, by the processor system and from the obtained sensor data, a respective quality value for each of a plurality of quality parameters;
   (d) determining, by the processor system, a cost of the current values of the respective iteration based on a combination of respective scaled differences of the quality values from respective target values of the respective quality parameters;
   (e) determining, by the processor system, whether the cost exceeds a threshold cost; and
   (f) in response to the cost being determined to exceed the threshold cost, modifying one or more of the respective current values of the plurality of process parameters, the current values thereby being updated for use in an immediately following other one of the iterations;
   wherein:
   the iterative process continues with the immediately following other of the iterations as long as the cost exceeds the cost threshold, and otherwise terminates with the current values of a last of the iterations being the final set, the final one of the iterations including steps (a)-(e); and
   the modifying the one or more of the respective current values of the process parameters is performed using Bayesian optimization that is performed (i) with a data-based process model, and (ii) to thereby select which of process parameters' respective current values are to be modified and the way in which the respective current values of the selected process parameters are to be modified based on maximizing a probability that respective variables of each of the plurality of quality parameters will be within respective predefined low and high boundaries.

2. The method as recited in claim 1, wherein in an acquisition function, as a function of which how the modifying is to be performed is ascertained, a probability is taken into consideration, which characterizes how probable it is that the predefined boundaries will be satisfied.

3. The method as recited in claim 2, wherein the probability is ascertained based on a data-based quality model.

4. The method as recited in claim 3, wherein the data-based quality model is configured to output parameters which characterize a statistical prediction of the result to be expected.

5. The method as recited in claim 4, wherein the data-based quality model includes a plurality of data-based quality models, each being used for a respective one of the quality parameters.

6. The method as recited in claim 5, wherein at least one of the data-based quality models is trained as a function of the results of the machining.

7. The method as recited in claim 6, wherein the at least one data-based quality model is trained additionally as a function of an estimated result.

8. The method as recited in claim 7, wherein:
   in a first phase, the at least one data-based quality model is trained as a function of the estimated results; and
   in a second phase, the at least one data-based quality model is trained as a function of the ascertained result which results from the machining.

9. The method as recited in claim 8, wherein the data-based model to be trained is given as a sum of a first regression model and a second regression model, the first regression model being trained in the first phase, and the second regression model being trained in the second phase.

10. The method as recited in claim 9, wherein the second regression model is a Gaussian process model.

11. The method as recited in claim 1, wherein, subsequent to obtaining the final set of values of the process parameters, the laser material processing machine is operated a plurality of times with the final set of values of the process parameters set without modification of the values of the process parameters.

12. A system comprising:
   a laser material processing machine;
   a sensor system; and
   a processor system that includes one or more processor, wherein the processor system is configured to, beginning with an initial set of respective values as respective current values of a plurality of process parameters, perform an iterative process that gradually modifies the respective current values to a final set of the respective values, the iterative process including the following in each iteration of the iterative process, except a final one of the iterations:
   (a) actuating, by the processor system, the laser material processing machine to perform a machining of a workpiece while set with the respective current values of the plurality of process parameters;
   (b) obtaining, by the processor system and from the sensor system, sensor data output by the sensor system based on sensing results of the machining performed in the respective iteration;
   (c) determining, by the processor system and from the obtained sensor data, a respective quality value for each of a plurality of quality parameters;
   (d) determining, by the processor system, a cost of the current values of the respective iteration based on a combination of respective scaled differences of the quality values from respective target values of the respective quality parameters;
   (e) determining, by the processor system, whether the cost exceeds a threshold cost; and
   (f) in response to the cost being determined to exceed the threshold cost, modifying one or more of the respective current values of the plurality of process parameters, the current values thereby being updated for use in an immediately following other one of the iterations;
   wherein:
      the iterative process continues with the immediately following other of the iterations as long as the cost exceeds the cost threshold, and otherwise terminates with the current values of a last of the iterations being the final set, the final one of the iterations including steps (a)-(e); and
      the modifying the one or more of the respective current values of the process parameters is performed using Bayesian optimization that is performed (i) with a data-based process model, and (ii) to thereby select which of process parameters' respective current values are to be modified and the way in which the respective current values of the selected process parameters are to be modified based on maximizing a probability that respective variables of each of the plurality of quality parameters will be within respective predefined low and high boundaries.

13. A non-transitory machine-readable memory medium on which is stored a computer program for operating a laser material processing machine, the computer program, when executed by a computer, causing the computer to perform the following steps:
   beginning with an initial set of respective values as respective current values of a plurality of process parameters, performing an iterative process that gradually modifies the respective current values to a final set of the respective values, the iterative process including the following in each iteration of the iterative process, except a final one of the iterations:
   (a) actuating, by a processor system that includes at least one processor, the laser material processing machine to perform a machining of a workpiece while set with the respective current values of the plurality of process parameters;
   (b) obtaining sensor data by a sensor system sensing results of the machining performed in the respective iteration;
   (c) determining, by the processor system and from the obtained sensor data, a respective quality value for each of a plurality of quality parameters;
   (d) determining, by the processor system, a cost of the current values of the respective iteration based on a combination of respective scaled differences of the quality values from respective target values of the respective quality parameters;
   (e) determining, by the processor system, whether the cost exceeds a threshold cost; and
   (f) in response to the cost being determined to exceed the threshold cost, modifying one or more of the respective current values of the plurality of process parameters, the current values thereby being updated for use in an immediately following other one of the iterations;
   wherein:
      the iterative process continues with the immediately following other of the iterations as long as the cost exceeds the cost threshold, and otherwise terminates with the current values of a last of the iterations being the final set, the final one of the iterations including steps (a)-(e); and
      the modifying the one or more of the respective current values of the process parameters is performed using Bayesian optimization that is performed (i) with a data-based process model, and (ii) to thereby select which of process parameters' respective current values are to be modified and the way in which the respective current values of the selected process parameters are to be modified based on maximizing a probability that respective variables of each of the plurality of quality parameters will be within respective predefined low and high boundaries.

* * * * *